May 21, 1968
W. G. HILL
3,384,212
SELF-ADJUSTING FLUID CLUTCH
Filed Oct. 21, 1966
2 Sheets-Sheet 1
Fig. 1.
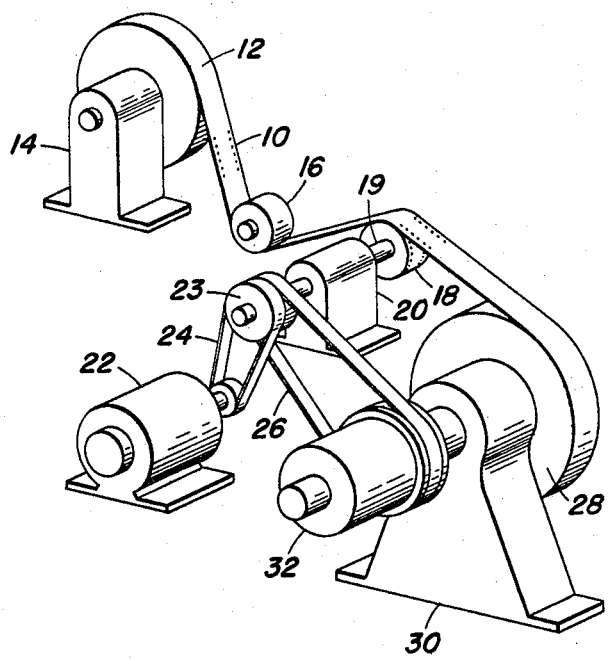
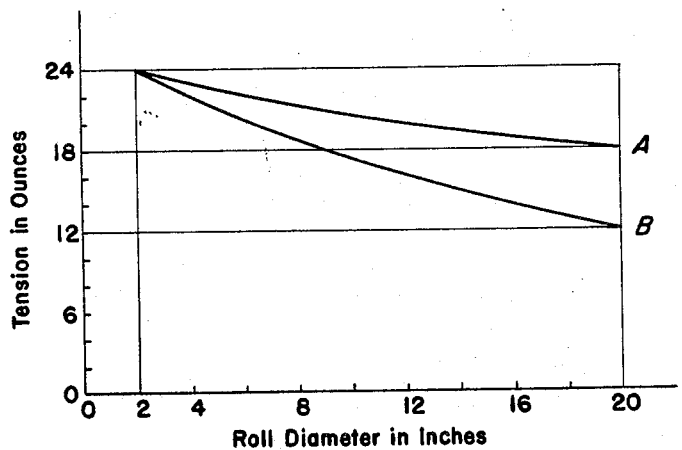
Fig. 3.
INVENTOR.
Wilbur G. Hill
BY  Edward H. Loveman
ATTORNEY May 21, 1968 — W. G. HILL — 3,384,212
SELF-ADJUSTING FLUID CLUTCH
Filed Oct. 21, 1966 — 2 Sheets-Sheet 2

INVENTOR.
Wilbur G. Hill

BY Edward H. Loveman

ATTORNEY

United States Patent Office 3,384,212
Patented May 21, 1968

3,384,212
SELF-ADJUSTING FLUID CLUTCH
Wilbur G. Hill, Binghamton, N.Y., assignor to General
Aniline & Film Corporation, New York, N.Y., a corporation of Delaware
Filed Oct. 21, 1966, Ser. No. 588,585
3 Claims. (Cl. 192—54)

ABSTRACT OF THE DISCLOSURE

The invention is concerned with automatically varying the torque capacity of a fluid clutch. Essentially, the fluid clutch is comprised of a conical drive member and a conical driven member, the latter of which is axially moved with respect to the driving member whereby any change in slippage between the members causes the driven member to move axially and thereby change the torque capacity of the clutch.

---

This invention relates to improvements in fluid clutches and, more particularly, to a fluid clutch having a self-adjusting torque dependent upon load conditions.

Clutches employing a hydraulic liquid as a fluid coupling are well known. Such clutches provide a smooth drive and tend to eliminate any irregularities in power transmission. Also, fluid clutches are adaptable for a number of types of power transmission, one of these types being the transmission of power to a film web drive.

In the common type of fluid clutch, the driving member and the driven member are separated and a viscous fluid is placed therebetween to transmit the torque. The torque transmitted depends upon various factors, such as the configuration of, and spacing between, the driving and driven members; the viscosity and amount of clutch fluid; and the speed and power applied to the driving member. The torque a fluid clutch will transmit may be determined if all of these parameters are known. Therefore, with a constant space between the driving member and the driven member, constant amount of clutch fluid and constant input power, there will be a smooth output torque which is also constant. However, in many applications of a fluid clutch it is highly desirable to provide adjustable means for varying the output torque capacity other than by varying the input speed. In other words, it is desirable to vary the torque capacity of the clutch without changing the input speed or power or by using a different type of clutch fluid such as oil having a different viscosity.

This invention provides a fluid clutch in which the torque capacity is variable by adjusting the clearance between the driven and driving members of the clutch. In accordance with this invention the driving and driven members which transmit the power are complementary and are tapered and positioned adjacent one another so that when moved axially the clearance between the tapered portions may be varied. Varying the clearance between the tapered portions of the driving and driven members by axial movement results in also varying the torque capacity of the clutch, even though the speed and the clutch fluid remain the same.

It is the primary object of this invention to provide a fluid clutch of the type described wherein the variation of torque output is self-compensating.

A particular feature of the invention is that the movement of the driving and driven members for closer or wider spacing, within predetermined limits, is automatically effected by changes in the load requirements.

Other objects and many of the attendant advantages of this invention will be readily appreciated as the same becomes better understood by reference to the following detailed description when considered in connection with the accompanying drawings, wherein:

FIG. 1 is a schematic perspective view of one particular application of the adjustable fluid clutch of this invention;

FIG. 3 is a set of curves showing the tension of the film web in a drive assembly as depicted in FIG. 1, in relation to the increase in roll diameter.

Figure 2:
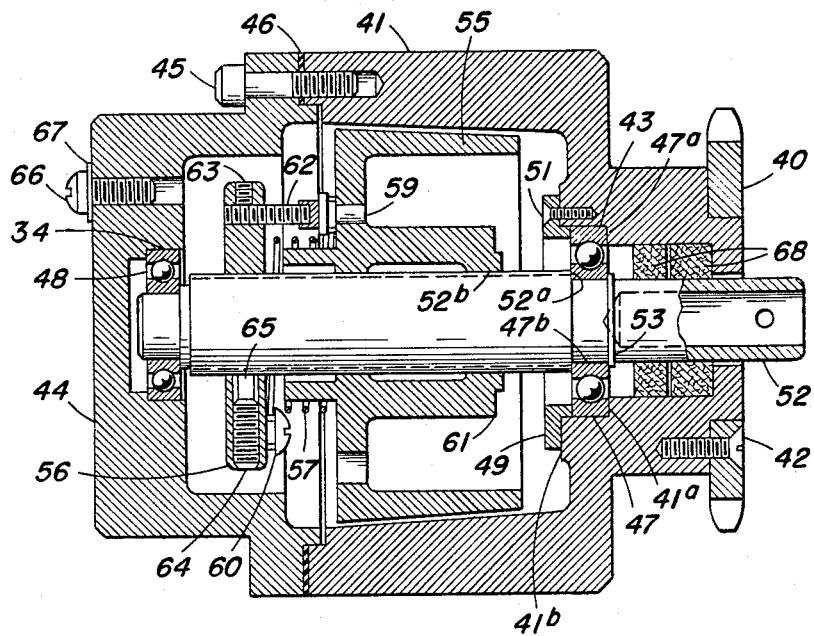
FIG. 2 is a sectional elevational view taken through the adjustable fluid clutch of this invention, showing the details thereof.

Referring now to the drawings wherein like reference characters designate like or corresponding parts throughout the several views, there is shown in FIG. 1, a system for winding a film web, such as motion picture film. A web 10, which has perforations along both edges thereof, is unwound from a roll 12 supported on an unwind stand 14. A braking torque for preventing rotary motion of roll 12 may be applied by mechanical means (not shown). After passing over a suitable idler roll such as idler 16, the web 10 passes to a feed sprocket 18 which is attached to one end of a shaft 19 supported by a bearing (not shown) housed within feed sprocket support 20. The feed sprocket 18 is driven at a constant speed by an electric motor 22 which drives a belt 24 engaging a pulley 23 secured to the other end of the shaft 19. Another belt 26, engages the pulley 23 to supply a constant speed input to to a self-adjusting fluid clutch 32, which is connected to a windup spindle for winding the web 10 on a windup roll 28. The windup roll 28 and clutch assembly are supported on a suitable stand 30.

By this arrangement the motor 22 drives the outer shell of the self-adjusting fluid clutch 32 at a substantially constant speed. The clutch 32 is filled with a suitable liquid power transfer medium such as silicone oil and provides a viscous coupling with a driven member within the shell. The construction of the self-compensating fluid clutch is seen in the detailed sectional view of FIG. 2.

When a non-adjustable fluid clutch is driven at a constant angular rate of input (r.p.m.) to propel the shaft for winding web material fed at substantially constant linear speed onto a roll with increasing diameter, the tension of winding imparted by the clutch falls off. The amount of tension falloff with increase in roll diameter depends on various factors including the initial rate of slip between the driving surfaces of the clutch members.

For certain applications such as winding delicate films, filaments, typewriter ribbons, and the like, a flatter pattern of winding with less falloff or decay in tension is desired than can be obtained with a fixed gap fluid clutch, particularly for large differences in roll diameters. It is known from experience also that some taper in tension rather than constant tension is desirable. Tests have shown that for winding certain films such as 16 mm., 35 mm., and 70 mm. films, on 2″ diameter cores to say 18″ at final outside diameter, the tension decay can be to 65%, more or less, of the value at the starting point. For a roll buildup from 2″ to 12″, the drop-off in tension for 12″ can be to 75%, more or less, of the initial tension.

As will be seen, the invention of a fluid clutch provides a simple self-contained mechanism to accomplish the desired requirements of tension for windup of film, paper, thread, typewriter ribbons, filaments, and the like, on rolls or on spools of increasing diameters. With each of the various controlling elements of the clutch set to provide the proper selected characteristic winding patterns, there should be no need to make adjustments or have service by maintenance mechanics except on rare occasions. A film perforating machine is a typical example where strands of material are produced in near continuous lengths and the material wound on a core to form rolls of varying diameters. Film slitters and the like are also such machines which produce long strands of material. It is for these types of machines in particular that the self-compensating fluid clutch herein described is particularly adaptable.

Referring now to FIG. 2, a chain sprocket 40 is driven by a motor (such as motor 22 in FIG. 1) and rigidly mounted to an outer shell 41 by screws 42. A cap 44 is in turn secured to the outer shell 41 by screws 45 and a leakproof gasket 46. The outer shell and cap 41 and 44 have respective internal support surfaces 43 and 34 for seating respective ball bearings 47 and 48. Outer race 47a of ball bearing 47 is axially supported between a retainer ring 49 and an inner face 41a of outer shell 41, and the inner race 47b is axially supported between a shaft step 52a of an output shaft 52 and a conventional C ring 53. Retainer 49 is secured to face 41b of the outer shell 41 by means of screws 51. The shaft 52, which is supported by the inner races of bearings 47 and 48, is threaded along the enlarged diameter 52b to receive the internally threaded portion of a rotor or inner shell 55 and a lock nut 56. Both rotor 55 and lock nut 56 are connected by a coil spring 57 which, at one end is fastened to rotor 55 by a stud 59 and, at the other end, to lock nut 56 by a screw 60. The internal surface of the outer shell 41 and the external surface of rotor 55 are cone-shaped. The narrow gap between these surfaces is filled with oil of a certain viscosity which is the driving element between the outer shell 41 and the output shaft 52. Outer shell 41 is driven at a constant rate, while the speed of rotor 55, i.e., output shaft 52, will vary with the requirements of the increasing diameter of the wound finished roll.

In operation when the r.p.m. of output shaft 52 decreases, slip on the conical surfaces increase and, therefore, the transmitted torque, increases. The increase in torque will be reacted by spring 57, which in turn will force rotor 55 to rotate with respect to output shaft 52 and, as it is rotating on the thread, it will move laterally toward the right (as viewed in FIG. 2) and thus narrow the gap between the outer shell 41 and the rotor 55. Therefore, while in a fixed gap type fluid clutch the increase in torque capacity is due solely to increasing slip as it is winding from an empty core to full diameter, in the self-adjusting fluid clutch, an additional torque increase will be effected due to the automatic narrowing of the gap during the winding operation.

As a special feature of this design, it should be noted that both maximum and minimum gaps are predetermined and can be accomplished by built-in stops. Minimum gaps will occur when a hub 61 of rotor 55 contacts the retainer 49. Maximum gap will occur when the stud 59 contacts an adjustable set screw 62. Set screw 62 is threaded in lock nut 56 and locked with another set screw 63. Lock nut 56 is locked to shaft 52 by a set screw 64 and a nylon plug 65. Filling of the clutch is accomplished by suitable holes in cap 44 which during the operation are plugged (as shown) by screws 66 and gasket 67. Two Garlock-type closures 68 are used to seal the assembly at the sprocket end.

The improved performance of the fluid clutch described above with respect to the conventional fixed gap clutch is illustrated in the graph of FIG. 3. It is seen that taking a windup from a 2″ roll to a diameter of 20″, the tension of the web material is reduced at a more uniform slope and at a lower rate. Curve A represents the change in tension expressed in ounces from 24 at 2″ diameter to approximately 18 at 20″; whereas curve B, representing a change in tension utilizing a fixed gap fluid clutch, falls down from the starting point of 24 ounces to approximately 12 ounces. The 6-ounce differential in ultimate tension is a considerable advantage in such operations.

From the above, it is clearly seen that the invention provides means for modifying the tension by reason of the fact that with the clutch being driven at substantially constant speed and the film being continuously fed at nearly constant linear speed onto the windup roll of increasing diameter (at continuing lower angular speed), the rate of slip in the viscous coupler of the clutch increases and the fluid gap is continuously lessened in order to effect greater torque transmission by the clutch. The torque imparted to the inner cone is increased as the rate of slip goes up and the spring member connecting the inner rotor to the drive shaft is wound to balance the resulting increase in torque, thereby causing the inner cone rotor to be advanced along the threaded shaft, thus bringing about a reduction in the fluid gap. This reduction in the fluid gap results in an increase in torque capacity transmission over and above that which is caused by the difference in slip rate alone. The resulting torque output, as slip increases, is to increase at a greater rate than in the case with a fluid clutch without the self-adjusting feature.

As the rotor is constrained to move alongside the shaft upon increase of slippage, the gap will be narrowed, hence the torque is increased. The spring member thus wound up stores energy and should the load at any time be lessened and thereby the slippage decreased, it will turn the rotor in the opposite direction to widen the gap and reduce the torque. In this manner, the clutch is truly self-adjusting in response to variations in load.

It should be understood, of course, that the foregoing disclosure relates to only a preferred embodiment of the invention and that it is intended to cover all changes and modifications of example of the invention herein chosen for the purposes of the disclosure, which do not constitute departures from the spirit and scope of the invention.

What is claimed is:
1. A fluid clutch comprising,
an output shaft,
an input driving member comprised of an outer shell rotatably supported on said shaft, said shell having an inner face of conical configuration,
a driven member comprising a rotor within said shell and having a conical outer surface, said conical surfaces defining a gap,
a viscous fluid in said gap forming the power transfer medium between said members,
resilient means connecting said rotor to said output shaft, and
gap adjusting means adapted to permit axial motion with respect to said output shaft whereby a change in slippage between said members causes said rotor to move axially thereby changing said gap and the torque output of said clutch.
2. A fluid clutch as defined in claim 1 wherein said resilient means is comprised of a coil spring having one end coupled to said rotor and the other end coupled to said shaft whereby decreased slippage between said members causes said spring to axially move said rotor to increase said gap.
3. A fluid clutch as defined in claim 1 wherein said gap adjusting means comprises a threaded portion on said shaft and a mating threaded portion on said rotor.

References Cited

UNITED STATES PATENTS

| 2,080,279 | 5/1937 | Kellogg | 192—58 |
| 2,094,095 | 9/1937 | Collins | 192—58 |
| 3,059,744 | 10/1962 | Sleeper | 192—58 |
| 3,120,299 | 2/1964 | Wallenberg et al. | 192—58 |

FOREIGN PATENTS 707,151   4/1954   Great Britain.

CARLTON R. CROYLE, *Primary Examiner.*

C. M. LEEDOM, *Assistant Examiner.*